(12) United States Patent
Yang (10) Patent No.: US 6,198,571 B1
(45) Date of Patent: Mar. 6, 2001

(54) COMPUTERIZED INTELLIGENT OPTICAL AMPLIFIER FOR MULTI-CHANNEL OPTICAL NETWORKS

(75) Inventor: Dan D. Yang, Gatineau (CA)

(73) Assignee: AFC Technologies Inc., Nepean (CA)

( * ) Notice: Subject to any disclaimer, the term of this patent is extended or adjusted under 35 U.S.C. 154(b) by 0 days.

(21) Appl. No.: 09/282,206

(22) Filed: Mar. 31, 1999

(51) Int. Cl.[7] .................................................. H01S 3/00
(52) U.S. Cl. ................................................ 359/337; 359/341
(58) Field of Search ................................. 359/341, 337, 359/124

(56) References Cited

U.S. PATENT DOCUMENTS

| | | | |
|---|---|---|---|
| 5,636,053 | * | 6/1997 | Pan .................................... 359/341 |
| 5,706,126 | * | 1/1998 | Fujita ................................. 359/341 |
| 5,784,192 | * | 7/1998 | Sugiyama et al. ................. 359/341 |
| 5,864,422 | * | 1/1999 | Miyazaki et al. .................. 359/341 |
| 5,892,616 | * | 4/1999 | Takahashi .......................... 359/341 |
| 5,896,221 | * | 4/1999 | Saeki .................................. 359/341 |
| 5,912,760 | * | 6/1999 | Sugiya ............................... 359/341 |

* cited by examiner

Primary Examiner—Stephen C. Buczinski
(74) Attorney, Agent, or Firm—Neil Teitelbaum (57) ABSTRACT

An optical amplifier having a substantially flat response over a multi-channel bandwidth for signals which have different input levels. It utilizes input and output photodetectors for detecting amplitude variations. The gain can be determined by a microprocessor receiving signals derived from the photodetectors, which causes change in the gain of the amplifier. The microprocessor calculates output ASE noise content at different amplifier input levels and subtracts that noise from the total power received by the output detector thereby determining an accurate amplifier gain value. The gain setting offered by the amplifier will then be the same as what is desired by a network management system.

23 Claims, 8 Drawing Sheets

COMPUTERIZED INTELLIGENT OPTICAL AMPLIFIER FOR MULTI-CHANNEL OPTICAL NETWORKS

FIELD OF THE INVENTION

This invention relates to optical amplifiers, and more particular to wide bandwidth optical amplifiers which can be used for multi-channel dense wavelength multiplexing based systems and networks.

BACKGROUND TO THE INVENTION

Optical amplifiers, in particular Erbium doped fiber based amplifiers (EDFAs) are currently the most commonly used optical amplification devices used to amplify optical signals which have been weakened by the attenuation of transmission fibers, and by network elements such as add/drop multiplexers, optical cross-connects, switches or routers. EDFAs are largely used for both short and long haul optical communication networks, as well as in CATV broadcasting. The newest wavelength division multiplexing (WDM) systems, in which all channels are carried simultaneously by the same fiber, require even more use EDFAs since the presence of multiple wavelengths (channels) offers great opportunity and flexibility for network planning and data/voice traffic routing.

The conventional EDFA bandwidth has been extended recently from the standard 1525–1565 nm band to a new 1565–1605 nm band. A broadband amplifier which covers the expanded band of 1525–1605 nm is described in U.S. patent application Ser. No. 09/026,657 filed Feb. 20, 1998 and entitled HIGH EFFICIENCY BANDWIDTH DOUBLED AND GAIN FLATTENED SILICA FIBER AMPLIFIER, and which is incorporated herein by reference. Therefore more bandwidth than previously has been made available to increase the number of channels which are carried, allowing optical networks to transport information at the speed of one or more terabits per second.

In an optical amplifier used in a single channel SONET/SDH system, there is little signal amplitude variation other than binary logical levels in which a signal is present or a signal is not present. The wavelength of the single channel is predetermined before the network has been installed. Amplifier response to a single wavelength is simple, as there is no competition among different channels.

On the other hand, in a Dense Wavelength Division Multiplex (DWDM) based network, in which there can be hundreds of channels, the amplitude variation of the input signal to the optical amplifier can be very large, with many thousands of combinations involving signal level and wavelength. As a result, the number of channels, or the total available optical signal input to the optical amplifier for amplification is substantially never constant. When data/voice traffic is low, only a few channels (transmitter/receiver pairs) operate. Traffic increase brings more channels into operation, and therefore the optical signal level needed for amplification is changed.

During transport, some channels may be dropped at a hub (e.g. at a town in the middle of the transport route, for example). At another hub, channels transporting traffic from a neighboring city may join the mainstream signals. This demonstrates two cases for signal level or quantity of channel change in the optical transport fiber.

When the number of channels is higher (thanks to a broader optical amplifier bandwidth), the magnitude of signal level change is also greater. For example, for a 100 channel DWDM system, signals entering an optical amplifier can change from a single channel having a weak signal (e.g. a tenth of a microwatt) to a hundred channels all at strong levels (tens of miliwatts), representing a total level change of ten thousand times.

From the point of view of the optical amplifier, the magnitude of amplification required for each channel depends not only on its input level, but also on the total number of channels (or the total composite input level). If the signal level is low (microwatts for example), large amplified spontaneous emission (ASE noise) will be generated, more at some wavelengths than at others, mixed together with the signals so that the amplifier system monitoring and gain control is affected. If the signal level is very large, the amplifier will operate in deep saturation and due to the physics of energy transfer between different atomic levels of Erbium ions, some channels will be more amplified while others are so depleted that they could experience loss instead of gain. Thus in DWDM systems, most of the amplifiers are required to operate in a constant gain mode, wherein no matter what is the input level, the amplifier pump power is adjusted to achieve always the same gain, which corresponds to a constant output per channel.

Figure 1:
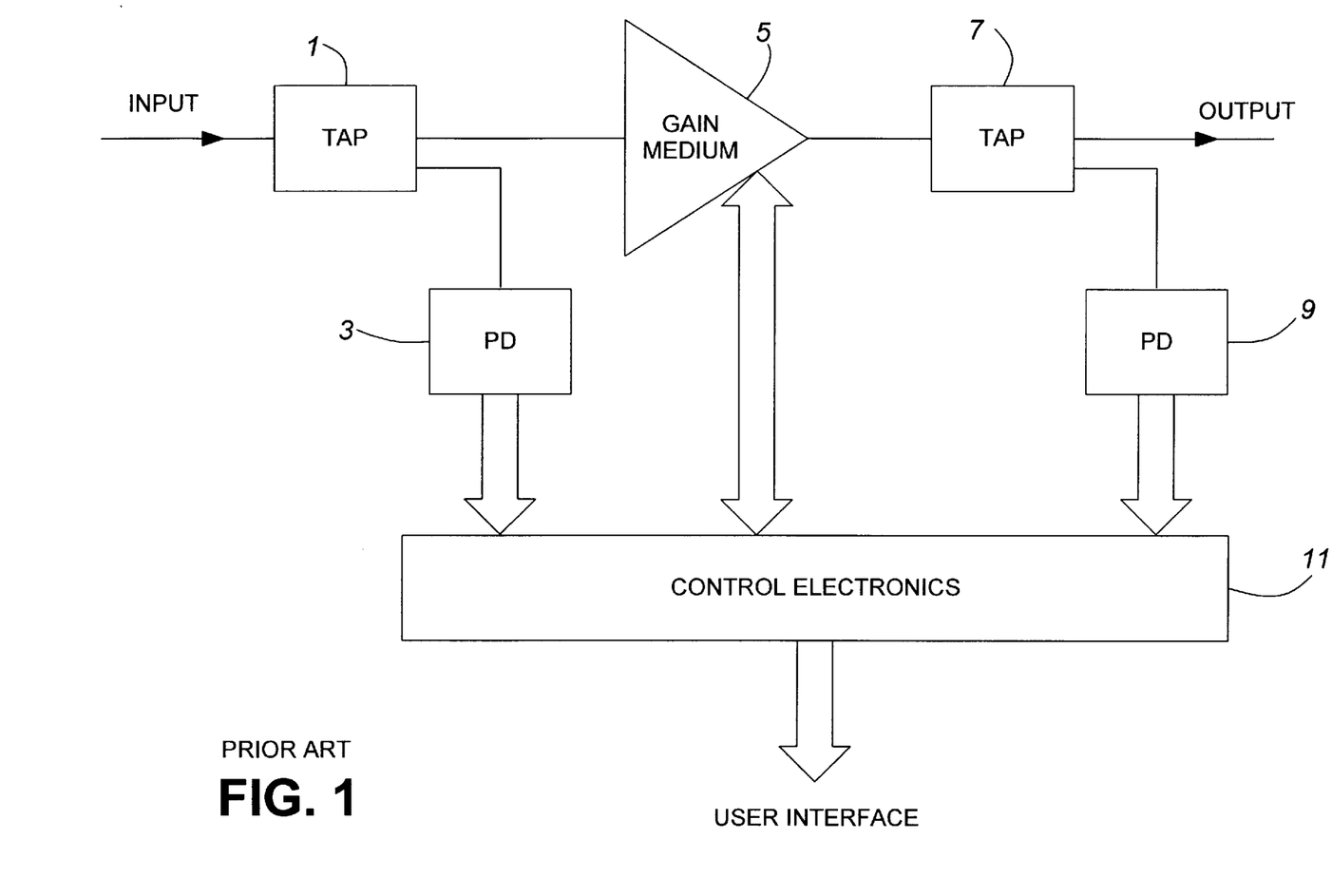
FIG. 1 is a block diagram of an adjustable gain optical amplifier system in accordance with the prior art.

An optical amplifier used in a fiber transport system usually has a typical block diagram shown in FIG. 1. A tap optocoupler 1 takes a small portion of an input optical signal and sends it to an input photodetector 3. The main optical signal is passed through an optical amplifier 5 (shown as a gain medium) which has controllable gain. A small portion of the output optical signal from the amplifier 5 is optocoupled via a tap 7 and is sent to an output photodetector 9. The photodetectors translate the detected portions of the optocoupled signals into electronic signals.

Each of the photodetectors 3 and 9 provides its respective electronic signal to an electronic control circuit 11 (which may or may not include a microprocessor). The control circuit calculates the gain by subtracting the amplitude of the detected portion of the output optical signal from the detected portion of the input optical signal, and reports this to a central network management system via a user interface. The gain of the optical amplifier 5 can also be controlled to a desired level, by receiving control signals derived from electronic signals provided from the user interface.

The optical amplifier 5 is usually comprised of a pumping source, coupling and directional devices, active amplification material and may also contain filters, gratings, etc. to provide gain flattening over the required band.

In order for the amplifier to accept and accurately execute control commands from the central network management system, accurate detection of the input and output signal via the two photodetectors is the most critical aspect. However, when the input signal amplitude varies by an order of ten or a hundred thousand times, the input detector cannot follow the signal, and does not have sufficient resolution to detect weaker signals. The output photodetectors detect only the total optical level, regardless of whether it consists of a signal or noise. If the electronic control circuit takes everything the output detector sends, the command from the central network management system can cause the amplifier gain setting to be executed with a large error when noise content becomes large.

Figure 2A:
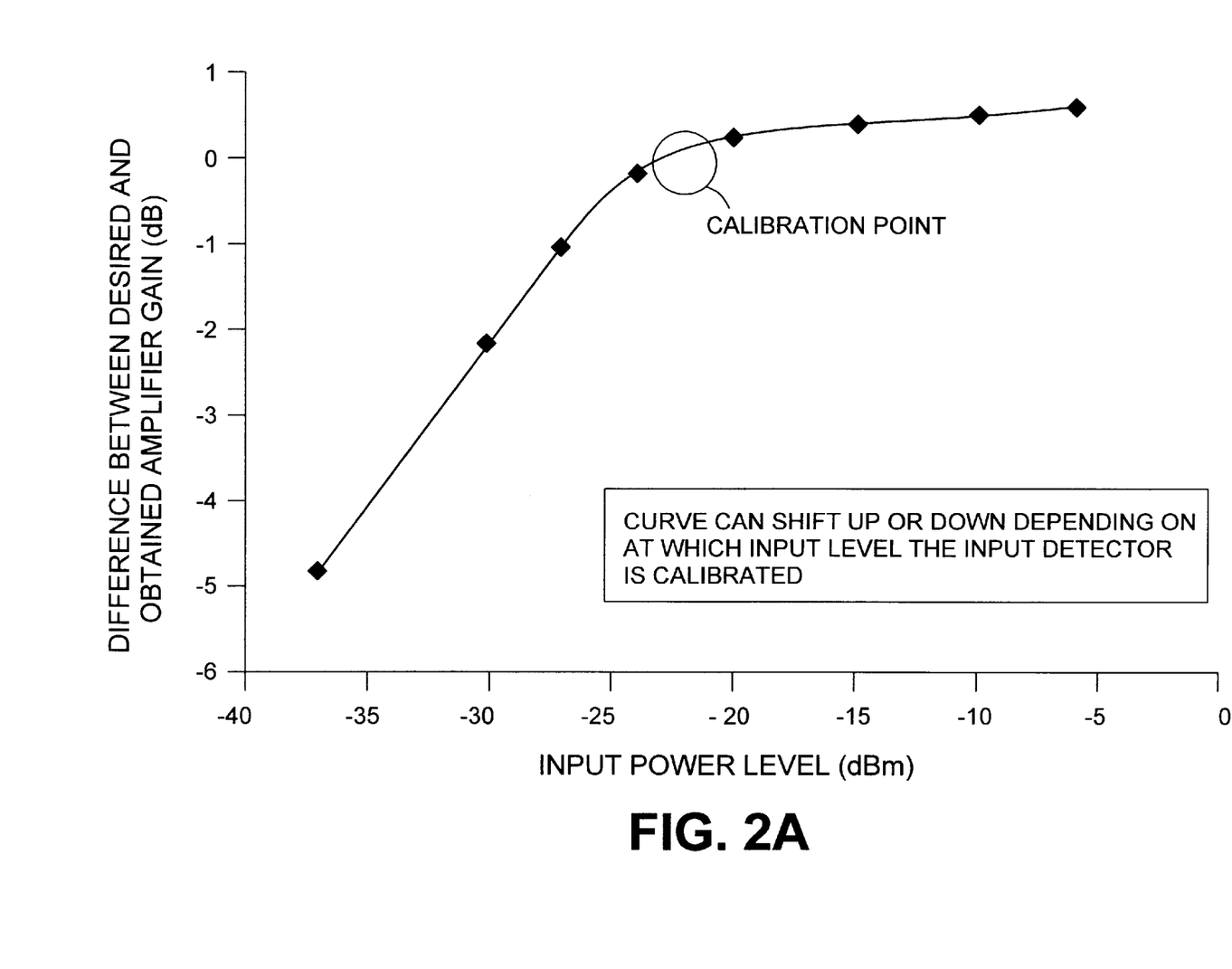
FIG. 2A is a graph of the difference between desired and obtained gain in an optical amplifier due to input signal monitoring, in accordance with the prior art.
Figure 2B:
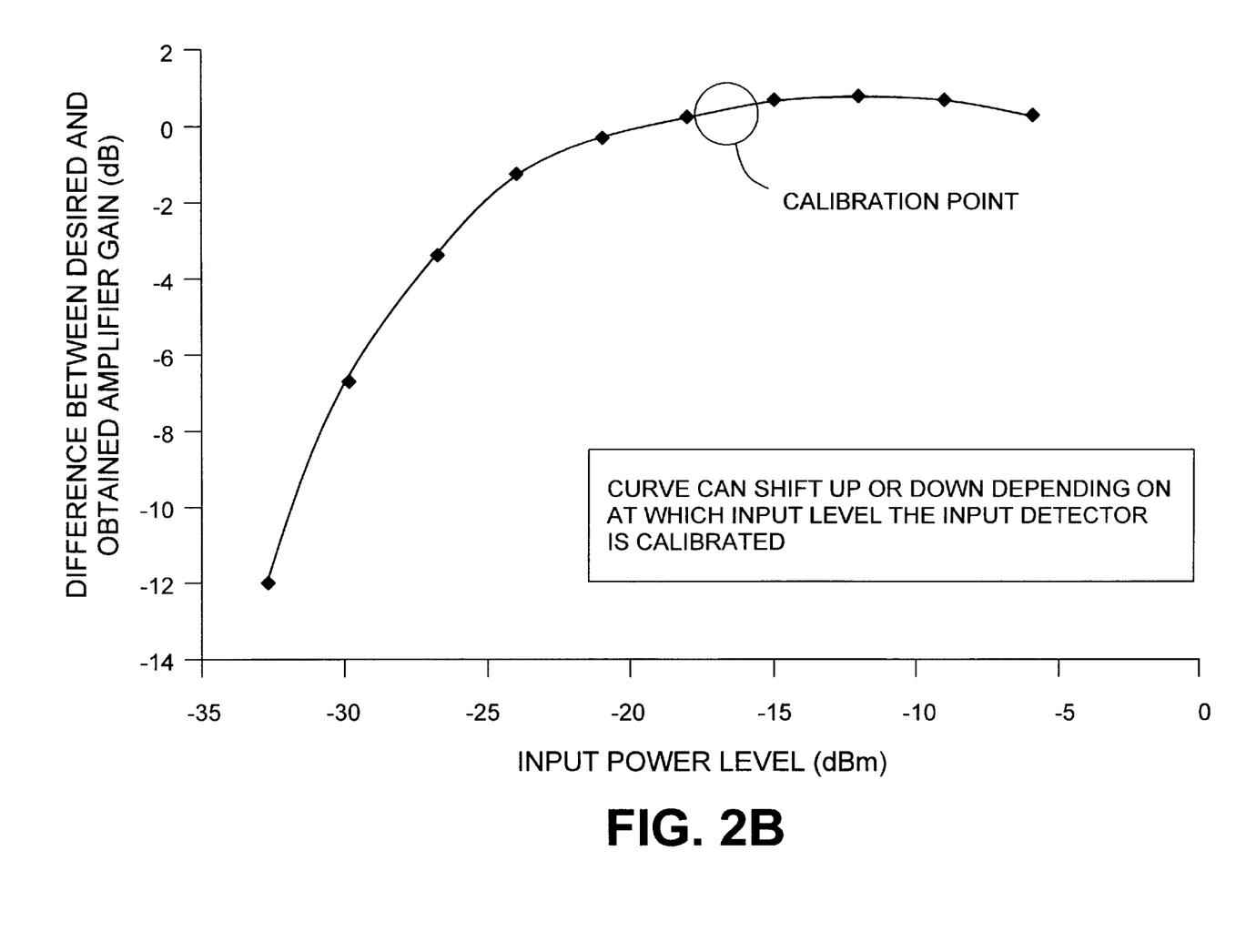
FIG. 2B is a graph of the difference between desired and obtained gain in an optical amplifier due to output detection noise, in accordance with the prior art.

FIG. 2 is a graph of the difference between the desired amplifier gain against input power level. It may be seen that this difference (i.e. the error) increases from an ideal (zero error, shown as the calibration point) with input power typically due to noise, and also increases with input power level from the calibration point, typically due to resolution or narrow dynamic range and/or saturation of the input and output signal level detectors. The overall error (the difference between the desired value set by the network management system and the actual value obtained from the amplifier), results from the sum of the two causes.

Figure 3:
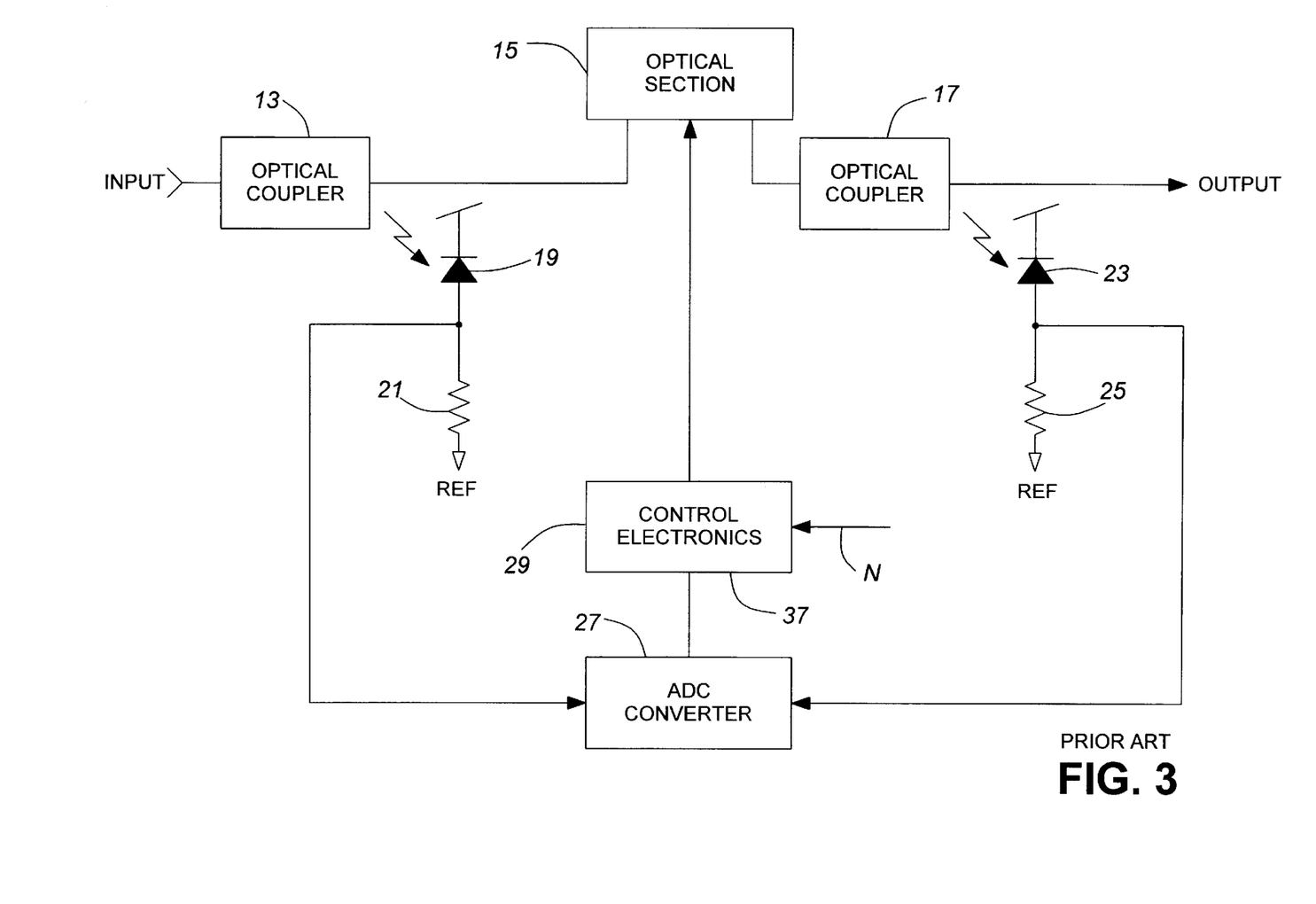
FIG. 3 is a diagram showing the prior art system of FIG. 1 in more detail.

FIG. 3 illustrates a photo-detection system which is commonly used as element 3 in the prior art system of FIG. 1. An optical coupler 13 provides a tap (element 1) function, and feeds an optical signal to the input of the optical section 15 of the system which includes the gain medium 5. The output signal from the optical section is applied to the input of an optical coupler 17 which provides the function of tap 7 of FIG. 1.

The optical coupler 13 provides at its output an optical signal which is detected in an input photo-detector 19, which can be comprised of a photodiode. The photodiode (its anode, as shown, or its cathode, depending on biasing polarity), is connected via a resistor 21 to a reference voltage source REF.

Similarly, the optical coupler 17 provides at its output an optical signal which is detected in an output photo-detector 23, which can be comprised of a photodiode. That photodiode (its anode, as shown, or its cathode, depending on biasing polarity), is connected via a resistor 25 to the reference voltage source REF.

An analog electrical output signal, representing the amplitude of the input optical signal, is taken from the junction of photo-detector 19 and is applied to an input of an analog to digital converter 27 in a microchip amplifier based system. Similarly, an analog electrical output signal, representing the amplitude of the optical signal which has been amplified in optical section 15, is taken from the junction of photo-detector 23 and is applied to another input of the analog to digital converter 27. The input signals to the analog to digital converter are converted to digital form and are applied to control electronics 29.

The control electronics receives an input signal N from the network administration system, indicating what is the desired gain of that stage, for the system. It divides the output signal amplitude with the input signal amplitude as indicated to the control electronics 29 by the respective signals detected from the photo-detectors via the analog to digital converter, to achieve a current amplifier gain value, and compares this with the desired gain. The control electronics then adjusts the pump power in a well known manner (not shown) to increase or decrease the gain of the optical section.

However, the optical section gain that is detected is not correct, due to ASE noise, as noted earlier. For that reason the measured gain is likely less than the real signal gain, and the amount of indicated correction will be less than what is really required.

In addition, the ASE noise changes with input optical signal amplitude, increasing with lower amplitude. Further, the noise level is different for differing wavelengths for a wideband amplifier, and for such an amplifier driven at different input signal amplitude levels at different wavelengths.

Thus the prior art detection circuit is not suitable particularly for wideband, non-saturated applications.

SUMMARY OF THE INVENTION

In accordance with the present invention, input and output signal monitors have been shown to be able to detect 40 dB (10,000 times) variation in a wideband optical signal amplitude, so that the optical amplifier can be controlled to a much more accurate degree than in the past. In addition, the ASE noise can be determined, and removed from consideration when determining the correct optical amplifier gain. As a result, gain control of a wideband optical amplifier can be obtained, and can be made substantially accurate, so that the optical amplifier response to different channels and signal levels is rendered uniform.

In accordance with an embodiment of the invention, a method of amplifying a broadband optical signal between an input to an output comprises:

(a) passing the optical signal through a broadband amplifier, (b) detecting an optical signal which is input to the optical amplifier, (c) detecting an optical signal which is output from the optical amplifier, and (d) modifying sensitivity of detection of the input and output optical signals to various amplitudes of the input optical signal.

In accordance with another embodiment, a method of amplifying a broadband optical signal between an input to an output comprises:

(a) passing the optical signal through a broadband amplifier which has adjustable gain, (b) determining actual gain of the broadband amplifier by dividing the amplitude of an optical signal input to the optical amplifier into an optical signal output from the optical amplifier, (c) adjusting the gain of the broadband amplifier to a desired gain, (d) determining amplitude of ASE noise in the output signal, (e) subtracting the amplitude of ASE noise in the output signal from the amplitude of the output signal to obtain a corrected output signal amplitude, (f) determining a gain error function using the determined gain, noise and signal amplitudes, and (g) adjusting the gain of the optical amplifier to correct for the noise amplitude, using the gain error function.

In accordance with another embodiment, an optical signal translation system comprises:

(a) a broadband optical amplifier, for receiving an input signal and delivering an output signal, (b) an input optical signal sampling device, (c) an output optical signal sampling device, (d) a control circuit for adjusting the gain of the optical amplifier based on a ratio between the sampled output signal and the sampled input optical signal relative to a desired gain, and (e) a circuit for modifying sensitivity of the sampling devices depending on the amplitude of the input signal.

In accordance with another embodiment of the invention, an optical signal translation system comprises:

(a) a broadband optical amplifier, for receiving an input signal and delivering an output signal, (b) an input optical signal sampling device, (c) an output optical signal sampling device, (d) a control circuit for adjusting the gain of the optical amplifier based on a ratio between the sampled output signal and the sampled input optical signal relative to a desired gain, and (e) a circuit for correcting the gain adjustment of the optical amplifier by subtracting a factor relating to ASE noise contained in the output signal.

BRIEF INTRODUCTION TO THE DRAWINGS

A better understanding of the invention may be obtained by reading the detailed description of the invention below, in conjunction with the following drawings, in which.

DESCRIPTION OF EMBODIMENTS OF THE INVENTION

An embodiment of the invention is comprised of an optical amplifier having a substantially flat response over the multi-channel bandwidth and for signals which have different input levels. It also includes a photodetector capable of detecting a large (e.g. 40 dB; ten thousand times) signal amplitude variation, so that whatever the input level, accurate input and output information can be sent to a microprocessor which is designated to retrieve the required information and react to changing channel and level conditions. The microprocessor calculates output ASE noise content at different amplifier input levels, so that noise is subtracted out of the total power received by the output detector. Thus the gain setting offered by the amplifier will be the same as what is desired by the network management system.

Figure 4:
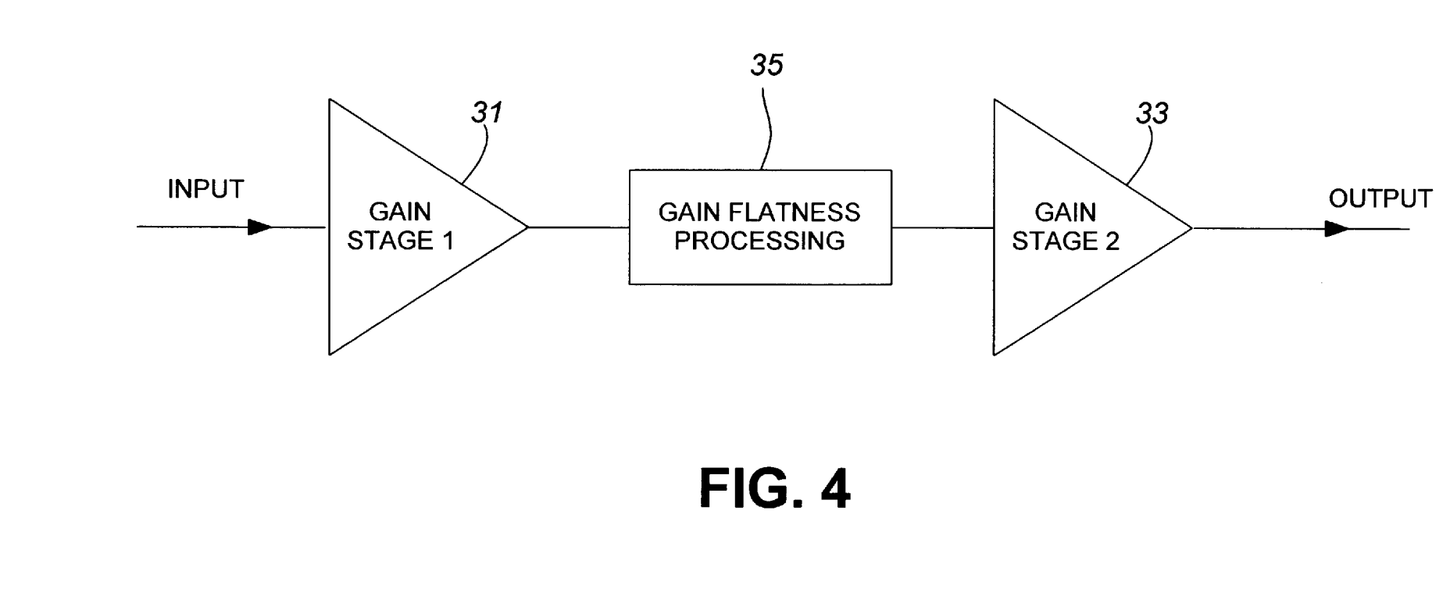
FIG. 4 is a block diagram of a wideband optical amplifier which can be used in this invention.

A low noise, high gain amplifier having substantially flat response to all channels (wavelengths) at different input amplitude levels is shown in FIG. 4. This is comprised of a well known amplifier having two serial stages 31 and 33, separated by a gain flatness processor such as a gain flattening filter 35. Stage 31 is comprised of a gain fiber, e.g. an Erbium doped amplifier fiber, which is pumped in the forward or backward direction by a pump laser. This provides several dB of gain to boost an incoming signal from the input.

Since amplification of the input signal in the 1525–1565 nm band is not uniform, the gain flattening filter 35 corrects the output signal of amplifier 31 gain differences for different wavelengths of the signal passing through amplifier 31. However, for amplification in the 1565–1605, it will be found that the filter 35 is optional.

The signal from the filter (which may be equalized) and a pump signal that may be chosen to bypass the filter is applied to the input of the second stage 33. This can be comprised of a section of gain fiber pumped in either the forward or backward direction. The pump power can come from a second pump laser, or from the leftover power of the first stage depending on the amplifier output requirements.

The filter may have whatever characteristic that may be desirable, e.g. a notch. Some wavelengths may have more gain in the second stage, and this should be taken into account.

In order to maintain flat response to all channels and low ASE noise generation at different input levels, it has been found that only forward pumping the first stage 31 by a pump laser emitting at about 980 nm can be used. It has been found that backward pumping and/or 1480 nm pumping will cause large noise when the input signal has low amplitude. This is believed to occur because pump power must be adjusted to a smaller level to maintain a constant gain for each channel required in a multi-channel signal transport system, and thus the first part of the first section of the Erbium fiber would not receive enough pump power, and results in insufficient gain for the incoming signal.

Figure 5:
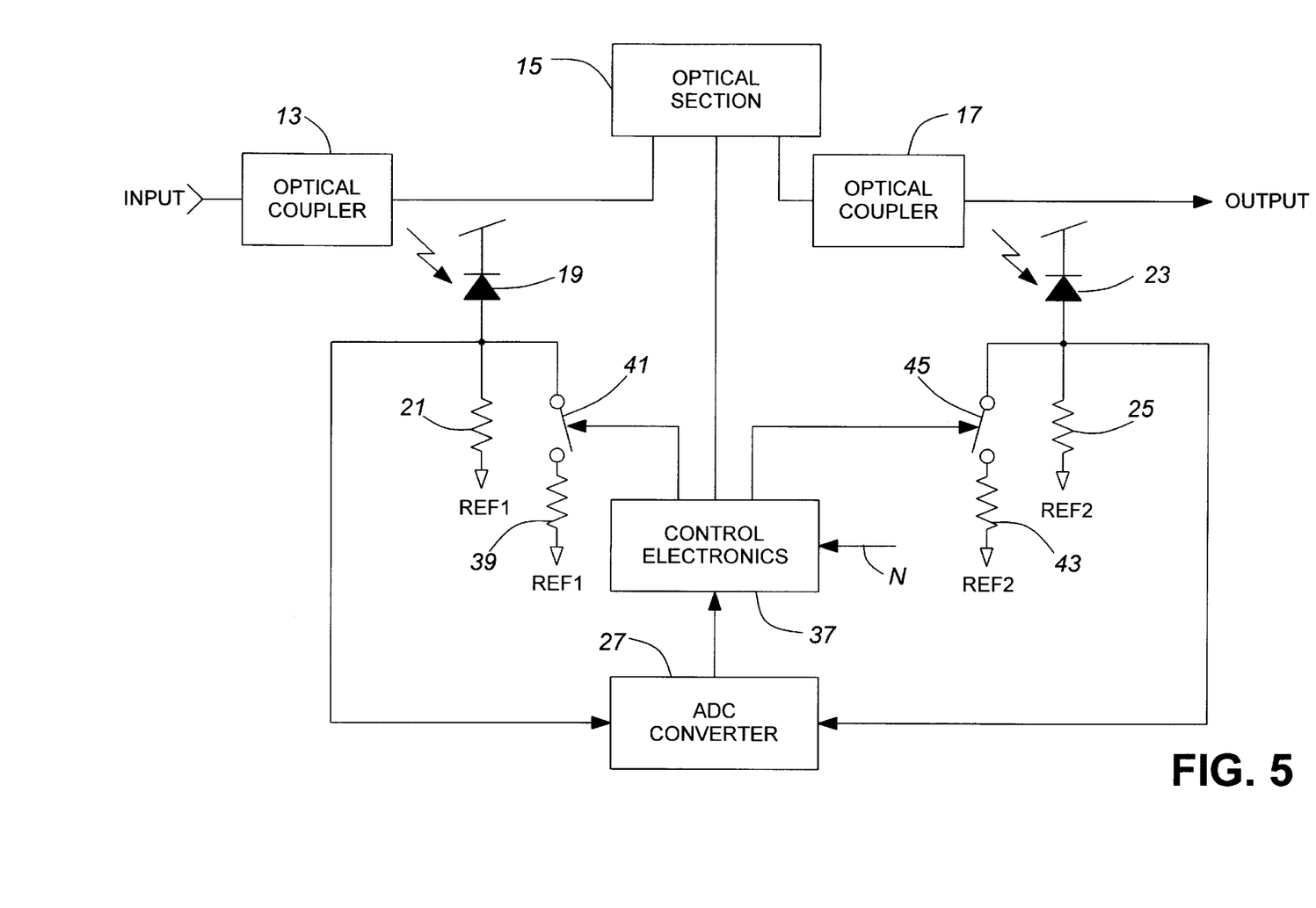
FIG. 5 is a diagram showing an embodiment of the present invention.

FIG. 5 illustrates a schematic diagram of a large dynamic range photo-detection circuit which can be used to achieve the benefits of this invention. The elements which are common from the prior art circuit of FIG. 3 are duplicated as to number and function. In this embodiment, the control electronics have additional function, and thus are shown by reference number 37.

Resistor 21 is bypassed by a resistor 39 in series with a controllable switch 41 (which can be a field effect transistor, for example). Resistor 25 is bypassed by a resistor 43 in series with a controllable switch 45 (which can also be a field effect transistor, for example). Each of the switches is controlled by control electronics 37. The resistors 39 and 43 can be switched in parallel with resistors 21 and 25 respectively, which will increase the detection range of the photo-detector circuit, as follows.

When the optical input signal to the system is small, the electrical signal sent to the analog to digital converter 27 will also be small. The control electronics should then send a command to cause the switch 41 to be off, so that only resistor 21 is in series with diode 19. The signal sent to the analog to digital converter, which will be proportional to the photo current times the resistance value of the resistor 21, will be large.

When the optical input signal to the system increases to a particular amplitude the optical signal threatens to saturate the ANALOG TO DIGITAL CONVERTER. The input signal to the ANALOG TO DIGITAL CONVERTER will exceed a predetermined range and the control electronics should then control switch 41 to close, connecting resistor 39 in parallel with resistor 21. The combined resistance in series with the photodiode 19 then decreases, and the analog signal sent to the ANALOG TO DIGITAL CONVERTER is caused to remain within a predetermined range, avoiding saturation.

Conversely, when the input signal decreases into the predetermined range, the control electronics can again control switch 41 to open, removing resistor 39 from its parallel connection with resistor 21.

It should be noted that more than one resistor can be progressively switched in or out of parallel connection with resistor 21, depending on the range, the linearity of the photoconductor and the linearity and saturation level of the ANALOG TO DIGITAL CONVERTER.

Resistor 43 and/or additional resistors, is similarly switched into parallel connection with resistor 25, in order to increase the detection measurement range of output signal photo-detection.

It should also be noted that the ranges for the input and output photo-detected signals could be different, the resistors can consist of different total and incremental resistance values and be switched in parallel at different power amplitude levels, and that the reference voltages REF1 and REF2 could be different.

The control electronics 37 is preferably comprised of a microprocessor, which stores the aforenoted amplitude ranges in a table in its memory, compares the amplitudes, and controls the switches 41 and 45 accordingly.

However, to achieve another benefit of the present invention, the control electronics calculates noise content, subtracts it from the received power from the output detector, and adjusts the pump laser for the amplifier in the optical section to obtain the desired gain. This is done after the input detection provides minimum error, with increased dynamic range in a circuit such as has been described above.

Noise content of the signal can be either measured directly, or can be calculated based on a theoretical model.

For good accuracy, direct measurement should be conducted, at least for each type of amplifier. To do so, the optical amplifier should be set at a desired gain, under microprocessor control. The gain of the amplifier should be measured. The input level of the optical signal should then be changed. The real gain should be measured, corresponding to each different input level. The difference between the desired gain and the real obtained gain provides an error function (substantially caused by noise). It has been found that the error function follows the same trend as the plot shown in FIG. 2B.

To calculate the noise content, the error function (e.g. as shown in FIG. 2B) can be simulated, for example as a polynomial function. To minimize microprocessor memory consumption, in the polynomial example the order of 2 can be used, which provides an error formula:

$$\text{Error}=A*(\text{input})^2+B*(\text{input})+C$$

Where A, B and C are constants subtracted from the measured data.

To correct the gain setting error due to ASE noise content in the output signal, the above formula should be processed by the microprocessor. The microprocessor obtains information fed by the input detection circuit, should calculate the error according to the formula, then should subtract the error and deduce a correct value for the amplifier gain setting. It should then send a signal to the optical pump to cause the amplifier gain to be adjusted to the correct value.

For example, in an amplifier having A, B and C constants measured and determined to be 0.0286, 0.8514 and 6.7429 respectively, the error formula is expressed as $$\text{Error}=0.0286*(\text{input})^2+0.8514*(\text{input})+6.7429$$

(all units being expressed in dB).

When the input signal amplitude is −30 dBm, the error due to the ASE content in the output is thus calculated by the above formula to be about 6.9 dB. If the management system requires a gain of 20 dB, the microprocessor will thus adjust the amplifier pump power to achieve 20+6.9=26.9 dB gain, which is the total output versus the input including signal gain of 20 dB plus 6.9 dB due to the ASE noise generated by the amplifier.

Figure 6:
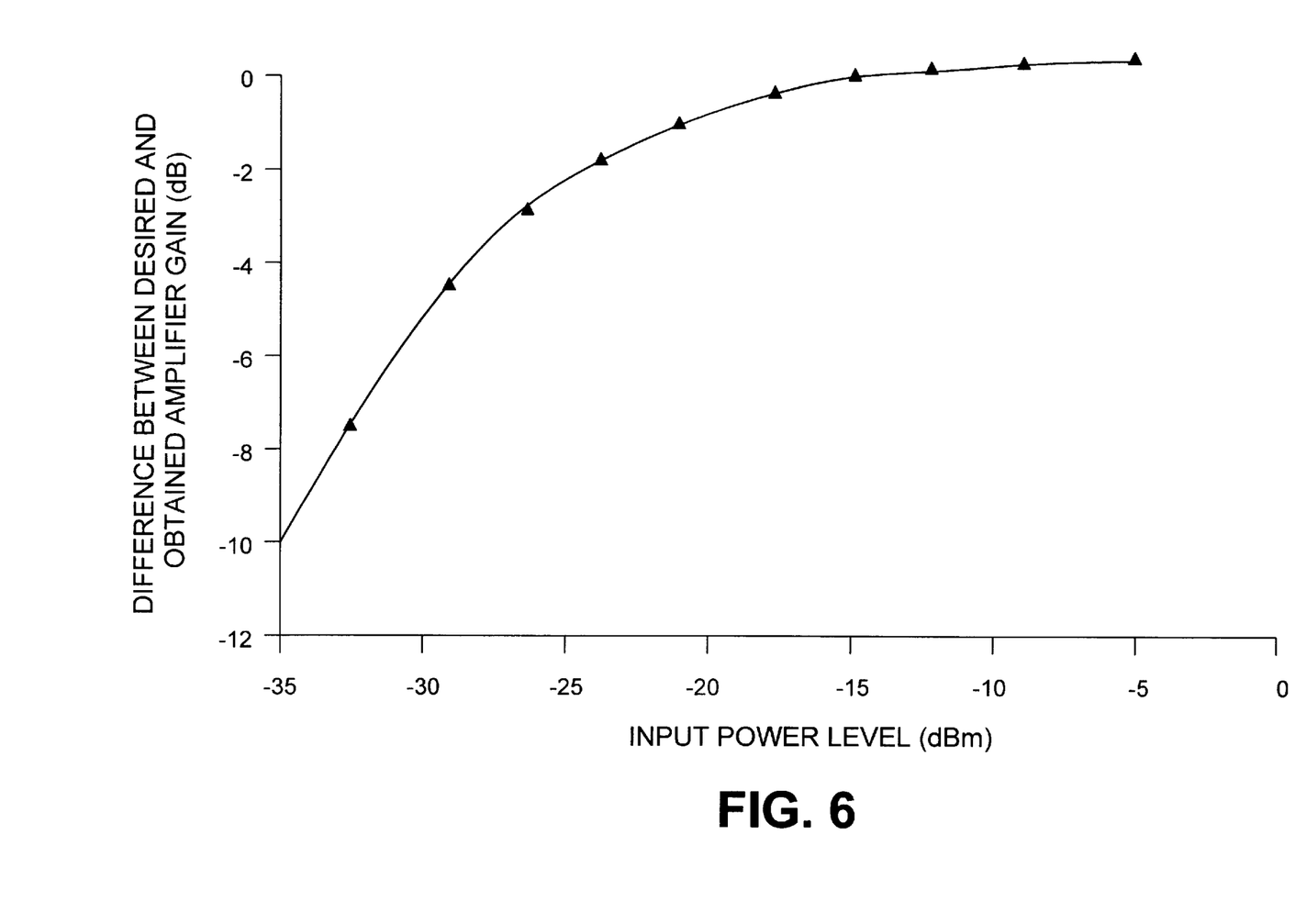
FIG. 6 is a plot of the difference between the desired and obtained gain setting of the amplifier with varying input power levels resulting in a prior art system.

The improvement in the gain linearity in a wideband amplifier has been shown to be very significant. FIG. 6 is a plot of the difference between the desired and the obtained amplifier gain, in dB, with input power amplitude level in dBm, in a system that does not have the error correction. Gain setting was 20 dB. Both the increase in difference as the input power level decreases, and the nonlinearity of the change in difference, are evident. With the gain setting of 20 dB, the obtained real gain setting was only 13.1 dB, since large amplified ASE noise exists at the amplifier output, mixed together with the signal, and all captured by the output detector.

Figure 7:
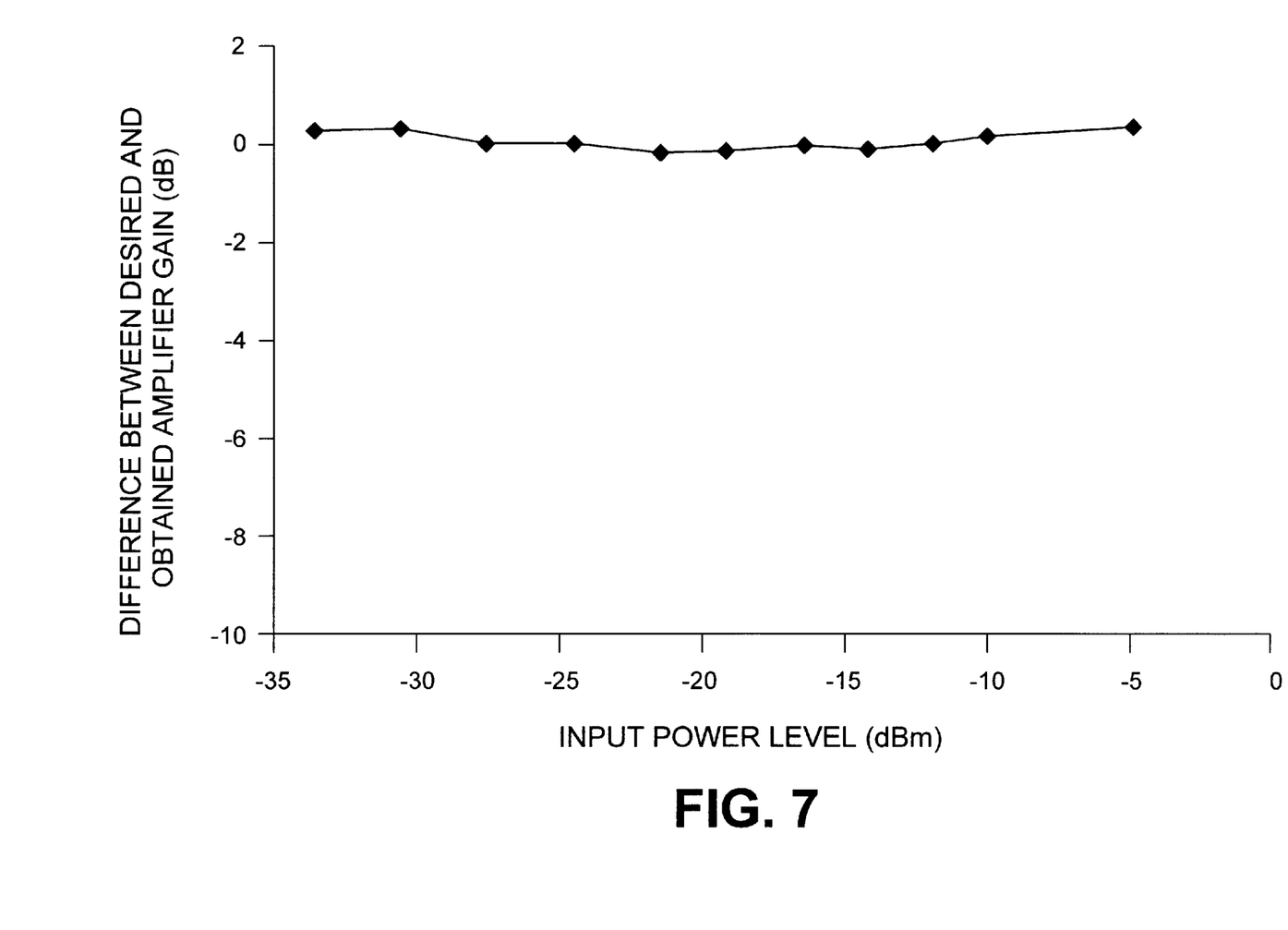
FIG. 7 is a plot of the difference between the desired and obtained gain setting of the amplifier with varying input power levels resulting from the present invention.

In contrast, a plot of the difference between the desired and the obtained amplifier gain with error correction as described herein, with power amplitude level, is shown in FIG. 7. The required gain setting was 20 dB, as in the previous example. It may be seen that there is little difference between the desired gain and the obtained amplifier gain; the measured gain corresponds to the required gain within about 0.5 dB.

The gain setting error due to ASE noise is thus corrected.

A person understanding the above-described invention may now conceive of alternative designs, using the principles described herein. All such designs which fall within the scope of the claims appended hereto are considered to be part of the present invention.

I claim:

1. An optical signal translation system comprising:
   (a) an optical amplifier, for receiving an input signal and delivering an amplified output signal,
   (b) an input optical signal sampling device,
   (c) an output optical signal sampling device,
   (d) a control circuit for adjusting the gain of the optical amplifier based on a ratio between the sampled output optical signal and the sampled input optical signal relative to a desired gain, and
   (e) a circuit for adjusting the detection range of the input and output sampling devices depending on the amplitude of the input signal, whereby the sampled input and output optical signals along with the ratio therebetween are accurately represented in the control circuit.

2. An optical signal translation system comprising:
   (a) an optical amplifier for receiving an input signal and delivering an amplified output signal,
   (b) an input optical signal sampling device,
   (c) an output optical signal sampling device,
   (d) a circuit for determining a correct gain of the optical amplifier based on the sampled output optical signal and the sampled input optical signal, wherein the determination includes the subtraction of a predetermined noise characteristic of the amplifier relating to the ASE noise contained in the output optical signal, and
   (e) a control circuit for adjusting the gain of the optical amplifier based on the difference between the correct gain and a desired gain.

3. A system as defined in claim 2 in which the noise characteristic of the amplifier relating to the ASE noise contained in the output optical signal is directly measured.

4. A system as defined in claim 2 further including a circuit for adjusting the detection range of the sampling devices depending on the amplitude of the input signal.

5. A system as defined in claim 4 including a circuit for subtracting ASE noise content from the sampled output signal after setting the amplifier so that the difference between a real obtained gain and the desired gain is a minimum, and for further adjusting the real gain using the sampled output signal with the noise content subtracted therefrom.

6. A system as defined in claim 5, in which the subtracting and further adjusting circuit is comprised of a microprocessor.

7. A system as defined in claim 6 in which difference between the real gain and the desired gain (error) is determined by $$\text{Error} = A*(\text{input})^2 + B*(\text{input}) + C$$

where A, B and C are constants subtracted from measured input signal power, and where "input" denotes the input power expressed in dBm.

8. A system as defined in claim 6 in which the difference between the real gain and the desired gain (error) is determined by a function which describes a curve.

9. A system as defined in claim 1 in which the input and output optical signal sampling devices are comprised of photo-detectors optically coupled to optical couplers connected to the input and output respectively of the optical amplifier, each of the photo detectors being connected in series with a resistance means to a reference voltage, the circuit for adjusting the detection range of the sampling devices being a controller for varying resistance of the resistance means.

10. A system as defined in claim 9 in which the controller includes means for reducing the resistance of the resistance means as the amplitude of the input signal increases.

11. A system as defined in claim 10 in which the resistance means is comprised of at least a pair of resistors, the circuit for adjusting the detection range of the sampling devices further comprising a switch for switching a resistor of the at least pair of resistors in parallel with another of the at least a pair of resistors as the amplitude of the input signal increases above a predetermined value.

12. A system as defined in claim 1 in which the circuit for adjusting the detection range of the sampling devices includes means for increasing the detection range of the sampling devices with increase in amplitude of the input signal above a predetermined level.

13. A system as defined in claim 5 in which the input and output optical signal sampling devices are comprised of photo-detectors optically coupled to optical couplers connected to the input and output respectively of the optical amplifier, each of the photo detectors being connected in series with a resistance means to a corresponding reference voltage, the circuit for adjusting the detection range of the sampling devices being a controller for varying resistance of the resistance means.

14. A system as defined in claim 13 in which the controller includes means for reducing the resistance of the resistance means with increase in amplitude of the input signal.

15. A system as defined in claim 14 in which the resistance means is comprised of at least a pair of resistors, the circuit for adjusting the detection range of the sampling devices further comprising a switch for switching a resistor of the at least a pair of resistors in parallel with another of the at least a pair of resistors.

16. A method according to claim 21, wherein step (d) includes:

determining amplitude of noise in the output signal, subtracting the amplitude of noise in the output signal from the amplitude of the output signal to obtain a corrected output signal amplitude, and determining a gain error function using the determined gain, noise and signal amplitudes; and wherein step) (e) includes:

adjusting the gain of the optical amplifier to correct for the noise amplitude, using the gain error function.

17. A method of amplifying an optical signal between an input and an output comprising:

(a) passing the optical signal through an amplifier, (b) detecting an optical signal which is input to the optical amplifier, (c) detecting an optical signal which is output from the optical amplifier, (d) adjusting a range of detection of the input and the output optical signals to varying amplitudes of the input optical signal, whereby the input and output optical signals along with a ratio therebetween are accurately represented in a control circuit; and (e) adjusting the gain of the optical amplifier based on the ratio between the input and output optical signals using the control circuit.

18. A method as defined in claim 17 in which step (d) comprises increasing the range of detection of the input and output optical signals with increasing amplitude of the input optical signal.

19. A method as defined in claim 16, including adjusting a range of detection of the input and output optical signals with varying amplitudes of the input optical signal.

20. A method as defined in claim 19 further comprising increasing the range of detection of the input and output optical signals with increasing amplitude of the input optical signal.

21. A method of amplifying an optical signal between an input and an output by a desired gain comprising:

(a) passing the optical signal through a amplifier, (b) detecting an optical signal which is input to the optical amplifier, (c) detecting an optical signal which is output from the optical amplifier, (d) determining a correct gain, based on the difference between the input optical signal and the output optical signal, wherein the determination includes subtracting a predetermined noise characteristic of the amplifier relating to the ASE noise contained in the output optical signal, and (e) adjusting the gain of the optical amplifier based on the difference between the determined correct gain and the desired gain.

22. A method of controlling the gain of an amplifier to provide a desired signal gain for a first optical signal substantially independent of ASE noise generated within the amplifier, the amplifier comprising an input port for inputting the first optical signal to be amplified, an output port for outputting an amplified optical signal consisting of the ASE noise and the first optical signal amplified, and a pump for providing pump energy, the method comprising the steps of:

comparing the amplified optical signal with the first optical signal and adjusting the comparison in dependence upon a predetermined noise characteristic of the amplifier relating to the ASE noise contained in the amplified optical signal to obtain a corrected gain; and adjusting the pump power in dependence upon the corrected gain to obtain the desired signal gain.

23. The method according to claim 22, further comprising determining the noise characteristic of the amplifier relating to the ASE noise contained in the amplified optical signal in response to the input signal over a wavelength band of which the amplifier is capable of providing amplification.

* * * * *